United States Patent [19]

Larocco

[11] Patent Number: 4,946,184
[45] Date of Patent: Aug. 7, 1990

[54] ANTIFRICTION TRAILER COUPLING ASSEMBLY

[75] Inventor: Michael Larocco, Murrysville, Pa.

[73] Assignee: American Made, Inc., Pittsburgh, Pa.

[21] Appl. No.: 311,098

[22] Filed: Feb. 15, 1989

[51] Int. Cl.$^5$ .............................................. B62D 53/08
[52] U.S. Cl. .................................................... 280/433
[58] Field of Search ................. 280/433, 440; 384/421; 105/199 R

[56] References Cited

U.S. PATENT DOCUMENTS

| | | | |
|---|---|---|---|
| 2,665,177 | 1/1954 | Schaefer | 384/421 |
| 2,915,320 | 12/1959 | Jewell et al. | 280/433 X |
| 3,218,989 | 11/1965 | Kreiner et al. | 105/200 |
| 3,275,390 | 9/1965 | Franks | 384/421 |
| 3,337,277 | 8/1967 | Arnold | 280/433 X |
| 4,121,853 | 10/1978 | McKay | 280/433 |
| 4,457,531 | 7/1984 | Hunger | 280/433 |

FOREIGN PATENT DOCUMENTS 214723  5/1958  Australia ............................. 280/433
3518540  11/1986  Fed. Rep. of Germany ...... 280/433

Primary Examiner—Mitchell J. Hill
Attorney, Agent, or Firm—Arnold B. Silverman

[57] ABSTRACT

A trailer coupling for use with tractors having a fifth wheel includes a coupling plate having an upper portion for securement to the trailer, a lower portion and a transitional portion extending from the upper portion to the lower portion. An antifriction member is secured adjacent to the lower surface of the lower portion. Openings are provided in the lower portion and antifriction member for passage of a downwardly projecting kingpin therethrough. Support members secure support edge portions of the antifriction member in securing the antifriction member adjacent to the coupling plate. The antifriction member is preferably composed of an ultra high molecular weight polyethylene. The use of through fasteners and the like in securing the antifriction member to the coupling plate is avoided.

30 Claims, 3 Drawing Sheets

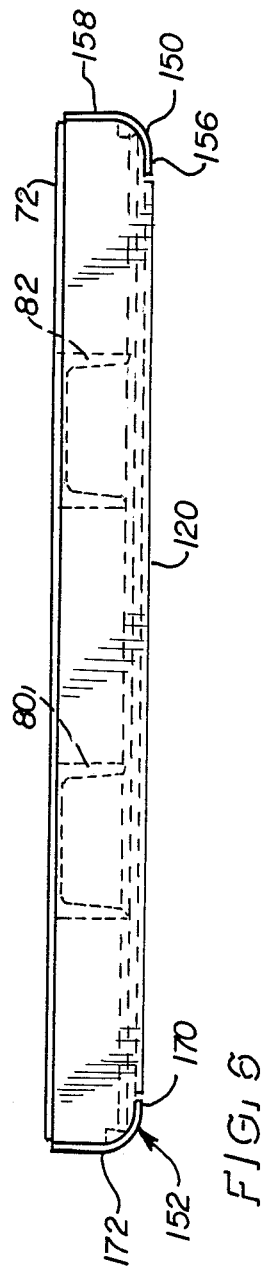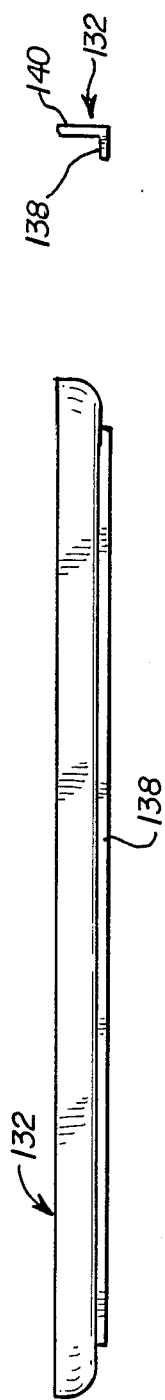

ANTIFRICTION TRAILER COUPLING ASSEMBLY

BACKGROUND OF THE INVENTION

1. Field of the Invention

The present invention relates to an improved trailer coupling construction for use in securing a trailer to a tractor having a fifth wheel and, more specifically, it relates to such a construction which provides effective antifriction properties.

2. Description of the Prior Art

In connection with tractor-trailer combinations, it has been known to provide a fifth wheel member on the power providing or tractor portion of the assembly. The fifth wheel construction generally consists of a steel plate having an opening which is adapted to receive a portion of the trailer coupling. The undersurface of a forward portion of the trailer generally has a steel plate secured to it with a downwardly depending king pin which is received within the opening of the fifth wheel. In this manner, the two vehicles are mechanically joined so that the tractor may pull the trailer while permitting the desired relative rotational movement. In moving such a vehicle, in order to minimize resistance to relative rotational movement between the contacting metal plates of the fifth wheel and tractor coupling, it has been known to provide lubrication such as a grease therebetween. One of the problems of such an approach has been the fact that the grease is effective for only a certain period of time and the further problem that the grease tends to entrap dirt particles which interfere with relative free rotational movement between the fifth wheel and the trailer coupling.

U S. Pat. No. 4,457,531 discloses the use of a Teflon (Polytetrafluoroethylene) layer on the tractor plate in cooperation with the steel plate 7 which is secured to the king pin of the trailer and is removable therefrom in order that the plate may be removed from the trailer when the tractor is to be coupled to other trailers. See also U.S. Pat. No. 3,218,989 which relates to use of an annular wear band and liner retainer for use in railway car truck bolsters.

U.S. Pat. No. 3,275,390 discloses securement of a self-lubricating material which may be polyethylene or polypropylene to a trailer body by means of a self-locking retainer ring. One problem with such construction is the risk of the ring breaking and causing dangerous conditions on the road.

U.S. Pat. No. 3,337,277 discloses the use of a layer of Polytetrafluoroethylene containing filler material such as fiberglas and carbon to increase the compressive strength of the material. Apertures pass through both the veneer and the plate. As the king pin has a fixed length increasing the thickness of the plate and veneer will interfere with securement of the fifth wheel to the trailer unless the king pin is enlarged.

U.S. Pat. No. 4,121,853 discloses the use of a sandwich containing a pair of metal plates between which a Teflon disk is inserted in a fifth wheel bearing attachment. The construction perpetuates contact between the metal undersurface of the trailer bearing element and the fifth wheel with the Teflon layer being said to carry the load and minimize frictional rubbing between the fifth wheel plate and the undersurface of the trailer.

It will be appreciated, therefore, that while the use of antifriction materials in lieu of grease has been suggested in the prior art, there remains a very real and substantial need for improved attachment means for trailer plates and improved materials for reducing friction and wear within such an environment.

SUMMARY OF THE INVENTION

The present invention has met the above-described need.

The present invention contemplates both a unique structural assembly and the use of improved materials in solving the hereinbefore described problems.

In one embodiment of the invention a coupling plate has an upper portion for securement to a trailer, a lower portion and a transitional portion extending from the upper portion to the lower portion. The lower portion has an opening through which king pin means pass. An antifriction member is secured to the lower surface of the lower portion without requiring the use of rings, bolts or other mechanical fasteners. The antifriction member also has an opening through which the king pin member passes.

A suitable material for use in the antifriction member of the present invention is a high density polyethylene with an ultra high molecular weight (UHMW) polyethylene being the preferred material. The material is preferably present in a thickness of about one-half to five-eighths of an inch.

The present invention avoids the use of holes through the antifriction and antiwearing material and provides unique means for securement thereof to the trailer coupler.

The trailer coupler in a preferred construction defines an upwardly open recess within which reinforcing means are positioned such that they will be interposed between the lower portion and the overlying trailer wall.

It is an object of the present invention to provide a trailer coupling which may be secured to the fifth wheel of a tractor and effectively reduce both friction and wear between the trailer coupling and the fifth wheel.

It is a further object of the present invention to provide such a construction which eliminates the need for bolts and other fasteners which pass through the coupler bearing plate of many prior art constructions, while retaining the shear strength of the plate.

It is a further object of the present invention to provide for the use of a unique materials which may be employed in the trailer coupling so as to provide a durable antifriction, antiwear surface in contact with the fifth wheel.

It is a further object of the present invention to provide such a construction which will significantly reduce the required maintenance on tractor trailer coupler mechanisms.

It is a further object of the present invention to provide such a construction which will eliminate the need for the use of lubricating pads, grease and like lubricants as in the prior art.

It is a further object of the invention to eliminate metal-to-metal contact between the trailer coupling and the fifth wheel during use.

It is another object of this invention to provide such a construction which resists damage to the antifriction portion during impact which occurs during securement of the tractor to the trailer, (frequently referred to as the "pinning" operation).

It is yet another object of the present invention to provide such a construction which permits use of conventional coupling and uncoupling techniques and may be used with a wide variety of trailer types.

These and other objects of the invention will be more fully understood from the following description of the invention on reference to the illustrations appended hereto.

BRIEF DESCRIPTION OF THE DRAWINGS

FIG. 6 is a right side elevational view of the trailer coupling shown in FIG. 2.

FIGS. 7 and 8 are, respectively, end and front elevations of a support member employed in the present invention.

FIGS. 9 and 10 are, respectively, end and front elevations of a support member employed in the present invention.

DESCRIPTION OF THE PREFERRED EMBODIMENT

Figure 1:
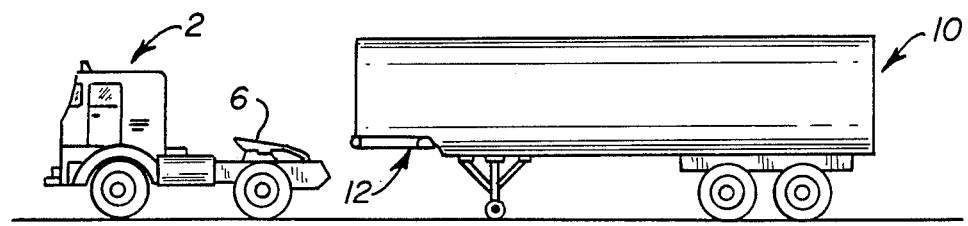
FIG. 1 is a schematic illustration of a tractor and trailer on which the present invention is usable.

Referring more specifically to FIG. 1 there is shown schematically a tractor 2 having a cab and a fifth wheel 6 which is disposed on an upper portion toward the rear of the tractor and is adapted to be used in securing the same to trailer 10 which in the form shown is a tank trailer. Trailer coupler 12 is disposed in a forward portion of the undersurface of the trailer and is adapted to be secured to the fifth wheel.

Figure 2:
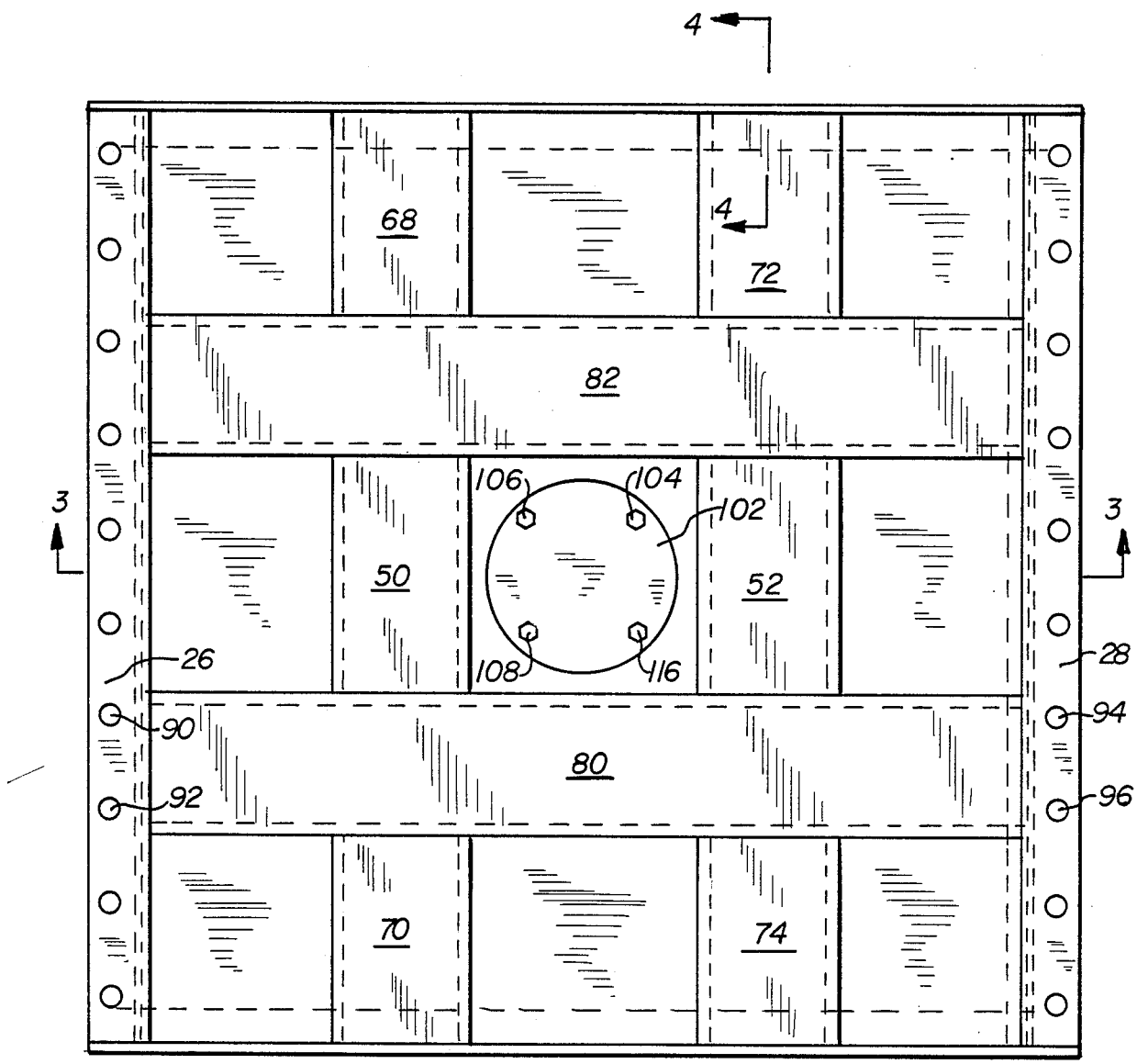
FIG. 2 is a top plan view of a form of trailer coupling plate of the present invention.
Figure 3:
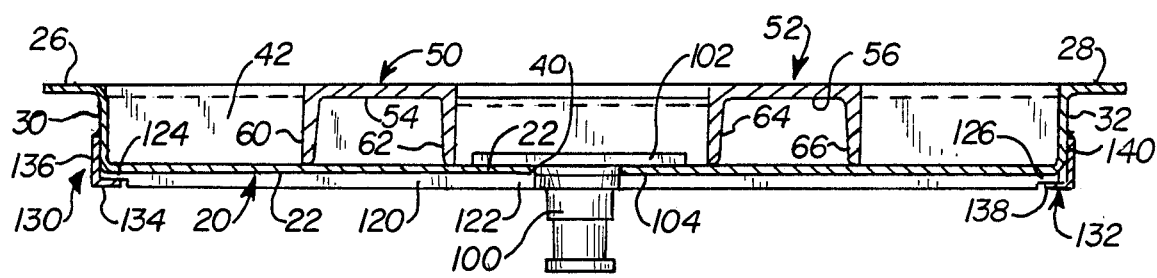
FIG. 3 is a cross-sectional illustration of the trailer coupling plate of FIG. 2 taken through 3—3.

Referring now to FIGS. 2 and 3 in greater detail, there is shown a coupling plate 20 which preferably is brake formed and is of unitary metal construction. The coupling plate, in the form shown, is of generally channel shaped configuration and has a lower portion 22, an upper portion which consists of a pair of generally outwardly directed flanges 26, 28 and a transitional portion which consists of portions 30 and 32 which respectively connect the lower portion 22 with upper portions 26 and 28. It will be appreciated that in the preferred form the coupling plate 20 has a generally centrally disposed opening 40. The plate is otherwise generally imperforate as the preferred embodiment of the present invention has eliminated the need for openings for mechanical fasteners through the lower portion 22 and transitional portions 30, 32. This unitary construction which is achieved through brake forming not only facilitates ease of manufacture, but also provides a product of improved strength.

The coupling plate defines a generally upwardly open recess 42. A series of metal generally channel shaped reinforcing members having a depth generally equal to that of recess 42 are provided in order to enhance the structural integrity of the coupling plate. Channel shaped reinforcing members 50 and 52 as shown in FIGS. 2 and 3 have, respectively, base portions 54, 56 and pairs of depending legs 60, 62 and 64, 66. The legs 60, 62, 64, 66 project in the direction of the lower portion 22 and preferably rest thereon. As is shown in plan view of FIG. 2, reinforcing members 68, 70 are generally aligned and in relative spaced relationship with respect to reinforcing member 50 and reinforcing members 72, 74 are generally aligned with and in relative spaced relationship with respect to reinforcing member 52.

Positioned transversely with respect to reinforcing members 50, 52, 68, 70, 72, 74 are elongated reinforcing members 80, 82 which may have the identical configuration as the other reinforcing members.

As shown in FIG. 2, upper portion 26 has a plurality of openings through which mechanical fasteners such as bolts may pass in securing the trailer coupling to the bottom wall of the trailer. In general, the bolts will have their heads disposed within the trailer. Two of these openings have been designated by the reference numbers 90, 92 as examples. Similarly, flange 28 has a plurality of openings, two of which 94, 96 have been identified. It will be appreciated that one of the beneficial features of the preferred embodiment of the present invention is that the sole openings for mechanical fasteners in the entire trailer coupling assembly are those contained within upper portions 26 and 28 for securing the assembly to the trailer frame.

It will also be appreciated that when the trailer coupling is intimately secured to the bottom wall of the trailer, the base portions of the reinforcing means will generally be in intimate contact therewith.

Figure 5:
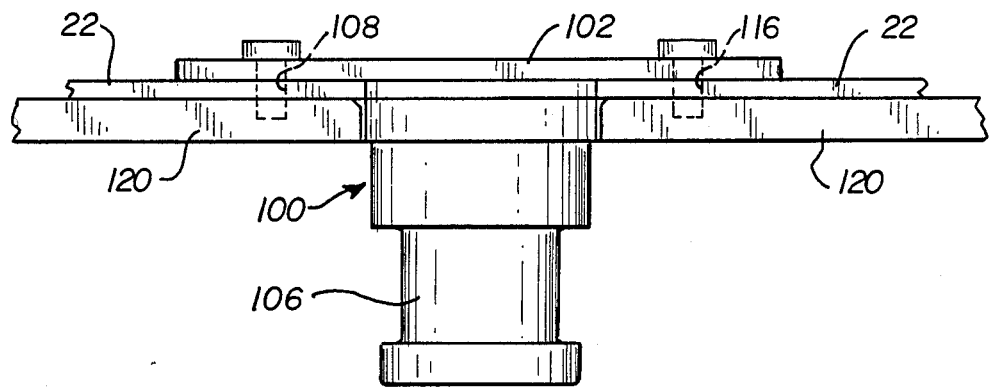
FIG. 5 is a fragmentary elevational view showing a portion of a king pin construction and adjacent parts of the coupling.

Referring to FIGS. 2, 3 and 5, there is shown a downwardly projecting king pin 100 which is secured to the trailer coupling and is adapted to be received within the opening of the fifth wheel of the tractor (not shown). The king pin 100 has an upper flange portion 102 which rests on lower portion 22 and has a series of openings 104, 106, 108, 116 through which fasteners may pass in securing the king pin to lower portion 22 of the coupling plate. In this manner the king pin 100 will be supported by and secured to the coupling plate. The fasteners which pass through holes 104, 106, 108, 116 preferably extend into but not through the antifriction member 120 to facilitate intimate securement thereof to coupling plate 20 while avoiding holes passing entirely through the antifriction member 120. In lieu of or in addition to fasteners passing through openings 104, 106, 108, 116, king pin flange 102 may be welded to lower portion 22. As shown in FIG. 5 the axial extent of depending king pin portion 106 is sufficient to permit effective engagement with the fifth wheel.

As is shown in FIG. 3, immediately underlying lower portion 20 and in intimate surface-to-surface contact therewith is an antifriction member 120. The antifriction member 120 has an opening 122 through which the king pin 100 passes. The antifriction member 120 serves to come into contact with the fifth wheel and provide greater freedom of relative rotational movement between the fifth wheel and the trailer coupling. In addition, it provides enhanced wear resistance as compared with steel as it eliminates the contact between the steel coupling plate and the steel fifth wheel.

It is preferred that the antifriction member 120 be composed of a dry, lubricant material which resists brittleness at reduced temperatures, is durable and possesses high lubricity. An ultra high molecular weight polyethylene may be employed. Among the preferred materials for use in the antifriction member 120 of the present invention is that sold under the trade designation "REPRO" by American Made, Inc. of Pittsburgh, Pa. This material which is a dry lubricant has a density of about 0.49 to 0.98 g/cm³ and a very low volumetric loss under the influence of abrasion as compared with other materials such as low density polyethylene and steel. The material also has high self lubricating properties with a static coefficient of friction in accordance with ASTEM D 1984 in contact with mild steel at about 0.15 to 0.20 and kinetic coefficient of friction in contact with mild steel is about 0.12 to 0.20. Examples of other suitable but less preferred materials are nylon and polytetrafluoroethylene (PTFE). It is preferred that the member have a uniform thickness of about one-half to five-eighths inch. Apart from the opening 122 it is preferably continuous and of substantially uniform thickness except for the edge portions to be described hereinafter.

Referring again to FIG. 3, there are shown the edge portions 124 and 126 of the antifriction member 120. It will be appreciated that these edge portions 124, 126 are of reduced thickness with respect to the remainder of the antifriction member. Similarly, the other two edges which are not shown are of reduced thickness. In securing the two edges shown in FIG. 3 to the coupling plate, a pair of elongated generally L-shaped angle members 130, 132 are employed. The support member 130 is preferably coextensive in length with the coupling plate 20. Support member 130 has a generally horizontally disposed leg 134 and a generally vertically disposed leg 136. Similarly, support member 132 has a generally horizontally disposed leg 138 and a generally vertically disposed leg 140. See also FIGS. 7 and 8. It is preferred that the upper legs 136, 140 be secured, respectively, to the transition walls 30, 32 by any suitable means such as welding. The legs 134, 138 are received within the reduced thickness portion of the edges 124, 126 of the antifriction member 120 and thereby provide effective support for these edges. The support is preferably longitudinally continuous.

It will be appreciated that in this manner, this portion of the securement of the antifriction member 120 to the trailer coupling is effected without the need to have mechanical fasteners passing through either the lower portion 22 of the coupling plate 20 or edge portions of the antifriction member 120.

Figure 4:
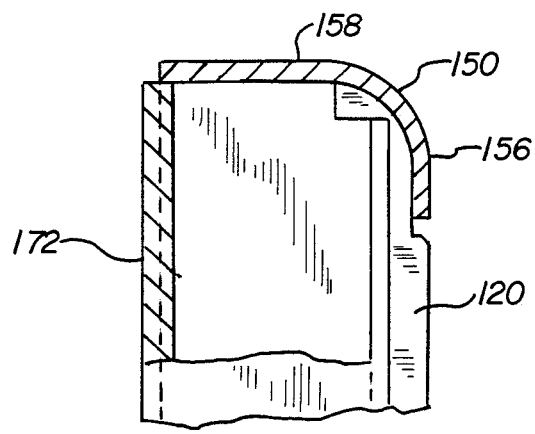
FIG. 4 is a partial cross-sectional illustration of the trailer coupling plate of the present invention taken through 4—4 of FIG. 2.

Referring to FIGS. 2, 4 and 6, preferred details of the securement of the other two edge portions of the antifriction material 120 will be discussed. A pair of generally L-shaped support members 150, 152 have curved transition portions. Support member 150 has a first leg 156 in underlying supporting contact with the antifriction member 120 in an area of reduced thickness and leg 158 is secured by suitable means as by welding to a portion of reinforcing members 68, 72. Similarly, support member 152 has a leg 170 in underlying supporting relationship with respect to an edge portion of antifriction member 120 and leg 172 is secured as by welding to reinforcing members 70, 74.

Referring to FIG. 4 it is preferred that antifriction member 120 have sufficient thickness that its outer surface be disposed farther out than the outermost portions of angle members 130, 132 and support members 150, 152 in order to resist undesired contact between the fifth wheel and the members 130, 132, 150, 152.

As shown in FIGS. 9 and 10, support member 150 is elongated and substantially continuous and coextensive with the edge portion of the antifriction member 120 to which it is secured. It has a substantially uniform cross-section throughout its length as is true with support member 150.

Referring to FIG. 8, it is noted that the left-hand portion of support member 132 has rounded ends so as to interfit with the adjacent support members 150, 152. It will be appreciated that support members 150, 152 will shield the edge portions of antifriction member 120 against damaging impact by the fifth wheel.

It will be appreciated, therefore, that the present invention has provided an effective and simple means for establishing a trailer coupling for a tractor-trailer combination which minimizes undesired use of mechanical fasteners, provides depth in reinforcement for the coupling plate and provides an integral antifriction antiwear member preferably composed of ultrahigh molecular weight polyethylene which is also preferably devoid of openings for passage of mechanical fasteners therethrough. All of this is accomplished in a manner which is consistent with existing tractor-trailer coupling and uncoupling procedures and standard tolerances.

While for convenience of illustration the invention has been disclosed in use with a tank trailer, it will be appreciated that the invention can be employed with other types of trailers such as box trailers and flat-bed trailers, for example.

Whereas particular embodiments of the invention have been described above for purposes of illustration, it will be evident to those skilled in the art that numerous variations of the details may be made without departing from the invention as defined in the appended claims.

I claim:

1. A trailer coupling for securing a trailer to a tractor having a fifth wheel comprising
    a coupling plate having an upper portion for securement to said trailer, a lower portion and a transitional portion extending from said upper portion to said lower portion,
    said lower portion having an opening,
    king pin means supported by said coupling plate and having a king pin member projecting downwardly therefrom,
    an antifriction member fixedly secured adjacent to the lower surface of said lower portion for substantial non-movement of said antifriction member relative to said lower portion,
    said antifriction member having an opening through which said king pin member projects, and
    said antifriction member further having a substantially continuous, non-interrupted antifrictional contacting surface except for said antifriction member opening for contacting the part of the fifth wheel which is attached to said tractor, thereby allowing relative movement between said trailer and said tractor.

2. The trailer coupling of claim 1 including
    said antifriction member further having a edge portions of reduced thickness with respect to the remainder thereof except for said antifriction member opening, and securing means engaging said edge portions of reduced thickness for said securing of said antifriction member to said coupling plate.

3. The trailer coupling of claim 2 including
    said coupling plate being of unitary construction.

4. The trailer coupling of claim 3 including
    said coupling plate defining a generaly upwardly open recess, and
    a plurality of elongated reinforcing members disposed within said recess.

5. The trailer coupling of claim 4 including
said reinforcing members being of generally channel shape and having their channel defining sides projecting downwardly toward said lower portion.

6. The trailer coupling of claim 5 including
said upper portion having a pair of generally outwardly projecting flanges extending from a pair of opposed sides of said coupling plate.

7. The trailer coupling of claim 6 including said edge portions having a first pair and a second pair of edge portions and said securing means having first securing means and second securing means, said first securing means joining said first pair of edge portions of said antifriction member to said coupling plate.

8. The trailer coupling of claim 7 including
said first securing means having a pair of elongated angle members each having a first leg secured to a said transitional portion and a second leg supporting an edge portion of said antifriction member.

9. The trailer coupling of claim 8 including said second securing means securing said second pair of edge portions of reduced thickness of said antifriction member to some of said reinforcing members.

10. The trailer coupling of claim 3 including
said antifriction member being composed of ultra high molecular weight polyethylene.

11. The trailer coupling of claim 10 including
said antifriction member having an average thickness of about one-half to five-eighths inch.

12. The trailer coupling of claim 2 including
said antifriction member except for said antifriction member opening and except for said edge portions being of substantially uniform thickness throughout.

13. The trailer coupling of claim 3 including
said upper portion having a plurality of openings for securing said coupling plate to said trailer by means of mechanical fasteners passing through said openings.

14. The trailer coupling of claim 13 including
said king pin means having an upper flange disposed on and secured to said coupling plate.

15. The trailer coupling of claim 14 including
said antifriction member secured to said king pin flange.

16. The trailer coupling of claim 1 including a plurality of aligned openings in at least said lower portion of said coupling plate and in said top surface of antifriction member for securing said antifriction member to said lower portion of said coupling plate by means of mechanical fasteners passing through said openings in said lower portion of said coupling plate and partially through said antifriction member.

17. A trailer coupling for securing a trailer to a tractor having a fifth wheel comprising
a coupling plate having an upper portion for securement to said trailer, a lower portion and a transitional portion extending from said upper portion to said lower portion,
said lower portion having an opening,
an antifriction member fixedly secured to the undersurface of said lower member for non-movement of said antifriction member relative to said lower member by securing means securing edge portions of said antifriction member to said coupling plate
said edge portions being of a reduced thickness with respect to the remainder of said antifriction member.

18. The trailer coupling of claim 17 including
said antifriction member composed of an ultra high molecular weight polyethylene material.

19. The trailer coupling of claim 18 including
said coupling plate being of unitary construction.

20. The trailer coupling of claim 18 including
said antifriction member having a thickness of about one-half to five-eighths inch.

21. The trailer coupling of claim 19, including
said coupling plate and said antifriction member having aligned openings, and
king pin means supported by said coupling plate and having a king pin member extending through said aligned openings and projecting downwardly.

22. The trailer coupling of claim 18 including
a plurality of generally channel shaped reinforcing members disposed within said coupling plate.

23. The trailer coupling of claim 22 including
said securing means including a pair of elongated angle members secured to said transition walls and supporting said edge portions of reduced thickness of said antifriction member.

24. The trailer coupling of claim 23 including
said support means including a pair of generally curve-shaped members each secured to at least one of said reinforcing means and supporting additional edge portions of said reduced thickness of said antifriction member.

25. A trailer coupling for securing a trailer to a tractor having a fifth wheel comprising
a coupling plate having an upper portion for securement to said trailer, a lower portion and a transitional portion extending from said upper portion to said lower portion,
an antifriction member with edge portions of reduced thickness with respect to the remainder of said antifriction member being fixedly secured in underlying surface-to-surface contact with said coupling plate, and
a king pin projecting downwardly from said coupling plate through an opening in said antifriction member.

26. The trailer of claim 25 including
said coupling plate being of unitary construction having a lower portion, an upper portion and a transitional portion.

27. The trailer of claim 26 including
said antifriction member being composed of an ultra high molecular weight polyethylene.

28. The trailer of claim 27 including
said antifriction member except for said opening being substantially continuous.

29. A trailer coupling for securing a trailer to a tractor having a fifth wheel comprising:
a coupling plate having an upper portion for securement to said trailer, a lower portion, and a transitional portion extending from said upper portion to said lower portion,
said lower portion having an opening,
king pin means supported by said coupling plate and having a kin pin member projecting downwardly therefrom,
an antifriction member secured adjacent to the lower surface of said lower portion,
said antifriction member having an enlarged opening through which said king pin member projects, and
said lower portion of said coupling plate and said antifriction member having a plurality of aligned openings for securing said antifriction member to said lower portion by means of mechanical fasteners passing through said openings in said lower portion and partially through said openings in said antifriction member.

30. A trailer coupling of claim 29 including said king pin means having an upper flange disposed and secured to said lower portion of said coupling plate, and said upper flange having a plurality of openings aligned with those of said lower portion and said antifriction member for receiving said mechanical fasteners for securing said antifriction member to said lower portion and to said king pin means.

* * * * *